United States Patent [19]

Strobl

[11] Patent Number: 4,584,498

[45] Date of Patent: Apr. 22, 1986

[54] COMMUTATOR WITH WINDING CONNECTIONS

[75] Inventor: Georg Strobl, Hong Kong, Hong Kong

[73] Assignee: Johnson Electric Industrial Manufactory Limited, Chaiwan, Hong Kong

[21] Appl. No.: 690,761

[22] Filed: Jan. 11, 1985

[30] Foreign Application Priority Data

Oct. 11, 1982 [GB] United Kingdom ................. 8228952

[51] Int. Cl.[4] ................................ H02K 13/04

[52] U.S. Cl. ................................ 310/236; 310/71

[58] Field of Search ................................ 310/232-237, 310/71

[56] References Cited

U.S. PATENT DOCUMENTS

| | | | |
|---|---|---|---|
| 3,271,604 | 9/1966 | Priddy | 310/71 X |
| 3,974,407 | 8/1976 | Dochterman | 310/71 |
| 4,038,573 | 7/1977 | Hillyer et al. | 310/71 |
| 4,114,056 | 9/1978 | Nimura | 310/71 UX |
| 4,283,841 | 8/1981 | Kamiyama | 310/236 X |
| 4,287,446 | 9/1981 | Lill et al. | 310/71 |
| 4,322,647 | 3/1982 | Neroda et al. | 310/71 |
| 4,340,829 | 7/1982 | McCoy | 310/71 |

*Primary Examiner*—Mark O. Budd

*Attorney, Agent, or Firm*—Louis E. Marn

[57] ABSTRACT

There is disclosed an armature for an electrical device having an armature winding electrically connected to an armature termination, the armature being connectable to an external circuit by the termination. The armature also has a housing in which a portion of the armature winding is located and in which the termination includes a terminal having a configuration for establishing and maintaining electrical contact between the terminal and the said winding portion while retaining the terminal and the said winding portion within the housing.

7 Claims, 6 Drawing Figures

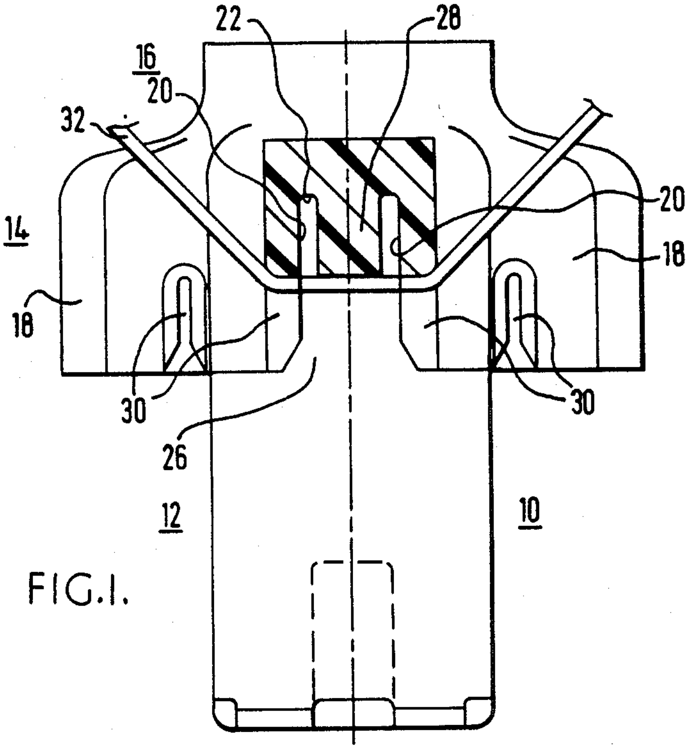
FIG.1.
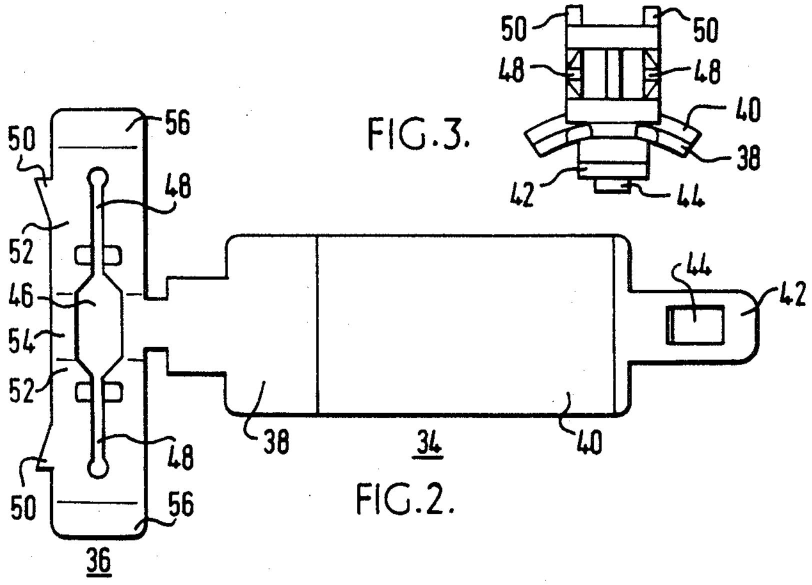
FIG.3.
FIG.2.

COMMUTATOR WITH WINDING CONNECTIONS

BACKGROUND OF THE INVENTION

1. Field of the Invention

This application is a continuation-in-part of U.S. application Ser. No. 06/526,152, filed Aug. 24, 1983. The present invention relates to an armature for an electrical device and to a method of connecting an armature winding to an armature termination, the armature termination being connectable to an external circuit.

In the manufacture of an armature for an electrical device it is necessary to provide an electrical connection between the armature and the commutator of slip ring which is used for effecting electrical contact between the armature winding and an external circuit.

2. Description of the Prior Art

A number of known methods for effecting such connections are in popular use. Where the winding is formed of low temperature wire it is usual to employ a soft solder and flux method or alternatively a cold crimp onto wire that has been stripped of insulation is used in order to effect a connection. When dealing with high temperature wires it is necessary to apply heat, and also possibly to apply flux so as to remove the coating of insulation from the end of the magnetic wire. Typical methods are hot forging, electric welding and gas welding. Occasionally such welding is undertaken in combination with sophisticated inert gas shrouds in order to minimize oxidation.

However, there are a number of inherent problems and undesirable side effects associated with all of the foregoing methods.

Heat causes embrittlement of the copper wire which is used for most armature windings and encourage rapid oxidation. The use of heat also demands a strong structure to support the commutator in order to minimize plastic distortion during soldering, forging or welding. This requirement usually demands the use of high temperature compression grade molding resins. A further common problem is caused by the accidental stripping of insulation during winding of the armature which is ofter automated. As the wire passes over the metal of the commutator damage can be caused to the wire insulation and such damage will ofter be manifest as a short circuited winding. Additionally, there is always a danger of slack in the winding wire causing fretting under the acceleration due to centrifugal and inertial forces.

These disadvantages place considerable limitations on the design and manufacture of commutators especially when such factors are closely cost controlled.

SUMMARY OF THE INVENTION

With a view to mitigating the above disadvantages the present invention provides, in the first aspect, an armature for an electrical device, having a connection between an armature winding and armature termination, the armature being connectable to an external circtuit by the termination, wherein the armature comprises a housing in which a portion of the armature winding is located and the termination includes a terminal having a configuration for establishing and maintaining electrical contact between the terminal and the said winding portion while retaining the terminal and the said winding portion within the housing.

According to a second aspect of the present invention there is provided a method of connecting an armature winding to an armature termination, the armature termination being connectable to an external circuit, comprising the steps of providing a housing on the armature, locating a portion of the armature winding in the housing, providing the termination with a terminal which has a configuration for establishing and maintaining electrical contact between the terminal and the said winding portion, and inserting the terminal into the housing so as to retain the terminal and the winding portion within the housing.

It will be appreciated that the present invention provides a connection between the armature winding and armature termination which avoids the application of heat to effect the connection. If the winding portion is provided with an insulation coating then the terminal of the termination can be provided with a configuration which severs the insulation so as to establish electrical contact between the wire and the terminal.

The manufacturers of rotating, dynamic and static electrical machinery have, since the early 1970's, utilized insulation displacement connectors. The principle of insulation displacement connection is that a wire having an insulating cover is forced into a slot narrower than the wire diameter, thereby displacing the insulation and forming a clean metal to metal contact between the wire and the terminal.

The present invention is concerned with the connection between an armature winding and an armature termination which includes a development of the insulation displacement connection principle. In the present invention the terminal is passed over the wire which is held stationary. The provision of a unitary armature termination and terminal and the ensuring benefits in assembling the armature are particularly advantageous.

BRIEF DESCRIPTION OF THE DRAWINGS

Embodiments of the present invention will now be described by way of example only and with reference to the accompanying drawings, in which:

FIG. 1 shows in plan view a body forming part of the armature and is partially sectioned to illustrate the configuration of one of the connection housings;

FIG. 2 is a plan view of an armature termination and terminal in blank form;

FIG. 3 is an end elevation of the termination and terminal of FIG. 2 showing the operational configuration of the termination and terminal;

DESCRIPTION OF THE PREFERRED EMBODIMENTS

Figure 4:
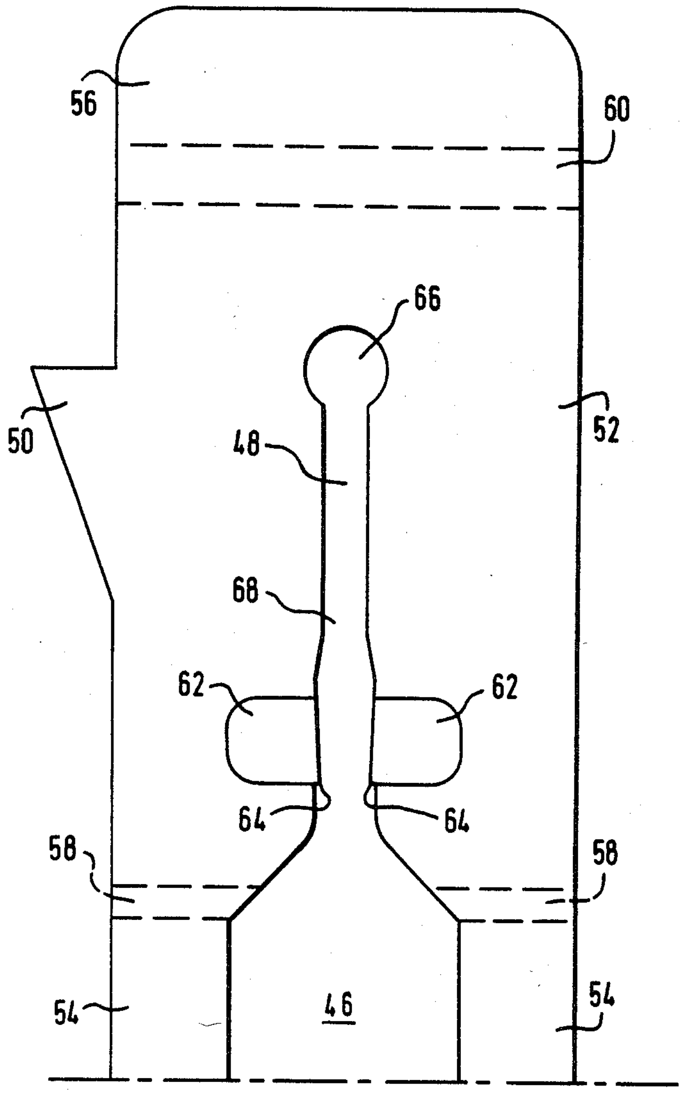
FIG. 4 is an enlarged view of one portion of the terminal shown in FIG. 2.

FIGS. 1 to 5 illustrate one embodiment of the invention in which the armature termination is in the form of a commutator having five segments. Five connections to the armature winding are required.

FIG. 1 shows a unitary plastic molded body 10. The body 10 has three sections, 12, 14 and 16, and is essentially a hollow cylinder with additional structure provided on its external surface, in its middle section 14. The shaft of an armature (not shown) passes through the body 10 and the portion 16 is a spacer which spaces the middle section 14 of the body 10 from the base of the armature stacks (not shown).

The middle portion 14 of the body 10 has five housings 18 equally spaced around the circumference of the body 10. Each of the housings 18 is used in effecting connection between a respective portion of the armature winding and one of the commutator segments.

Section 12 of the body 10 provides support for the commutator segments.

One of the housings 18 is shown in FIG. 1. The housing 18 has side walls 20, an end wall 22 and a cover 24. The end wall 22 is adjacent the spacer 16 and an opening 26 which faces the commutator support 12 is provided by the walls 20, 22 and cover 24. The side walls are parallel with the longitudinal axis of the body 10.

One of the housings 18 is shown in section in FIG. 1. The housing 18 has side walls 20, an end wall 22 and a cover 24. The end wall 22 is adjacent the spacer 16 and an opening 26 which faces the commutator support 12 is provided by the walls 20, 22 and cover 24. The side walls are parallel with the longitudinal axis of the body 10.

A boss 28 projects centrally from the internal surfaces of the end wall 22 and extends within the housing 18 for approximately half the length of the side walls 20. The boss 28 extends parallel with the longitudinal axis of the body 10 and is only connected to the body 10 by the end wall 22. Each side wall 20 of the housing 18 has a slot 30 which extends parallel to the longitudinal axis of the body 10, from the commutator end of the housing 18 for a length which terminates at the level of the free end of the bores 28. A portion 32 of the armature winding is passed through the slots 30 of one of the housing 18 and the winding portion 32 rests on the end of the boss 28. The external surfaces of the side walls 20 are bevelled so as to facilitate entry of the winding portion 32 into the slots.

The combined commutator segment 34 and terminal 36 are illustrated in FIGS. 2 and 3. FIG. 2 shows the combination in the form of a blank and FIG. 3 is an end elevation of the combination when formed into its operational configuration. The commutator segment 34 has a base 38 which carries an overlay 40. A lug 42 of reduced width is provided at the front end of the base 38 and the lug 42 has a central struck-up tap 44.

At its rear end, the base 38 of the commutator segment 34 is connected to the terminal 36. The terminal 36 is rectangular with its minor axis coincident with the longitudinal axis of the commutator segment 34. The terminal 36 has a central cut out portion 46 which is symmetrical with respect to both the major and minor axis of the terminal 36. The cut out 46 reduces from its largest width at the center of the terminal to two key hold shaped portions 48 which terminate either end of the cut out 46. A triangular barb 50 is provided on either side of the minor axis of the terminal 36 along the edge furthest from the commutator segment 34.

As can be seen from FIG. 3, the base 38 and the overlay 40 of the commutator segment 34 are or arcuate form which conforms to the external radius of the commutator support section 12 of the body 10. The lug 42 extends below the base 38 and back along the length of the commutator section 34 with the tag 44 projecting below the lug 42. Terminal 36 is bent upright from the commutator segment 34 and the arms 52 of the terminal 36, which include the respective key hole formations 48, are bent at 90° to the central portion 54 of the terminal. The arms 52 therefore extend parallel to each other and to the longitudinal axis of the commutator segment 34, and forward along the length thereof. The free ends 56 of the terminal 36 are bent so as to be inclined towards each other when the arms 52 have been bent parallel to each other.

FIG. 4 shows one-half of the terminal 36 of FIG. 2, on an enlarged scale. Areas 58 are shown in which bending occurs between the central portion 54 and the arm 52. Area 60 is also indicated in which bending between the arm 52 and the extreme end portion 56 occurs. However, the main purpose of FIG. 4 is to illustrate the detailed structure of the key hole cut out section 48. It is this feature which ensures contact with the armature winding portion 32. The reduction is size from the center of the cut portion 46 to the start of the key hole portion 48 provides a funnel for guiding one arm 52 onto the winding portion 32. A short distance into the key hole portion 48 there are located two cutters 62 which have sharp edges 64 projecting into the cut out 48. The cutters 62 are formed from the arm 52 but are partially severed therefrom such that the sharp edges 64 are resiliently urged into the cut out 48. Along the cut out 48, behind the cutters 62, there is a further small reduction in width. Circular end 66 of cut out 48 ensures that the edges of the cut out 48 have a certain resilience to separation by the armature poriton 32.

Figure 5:
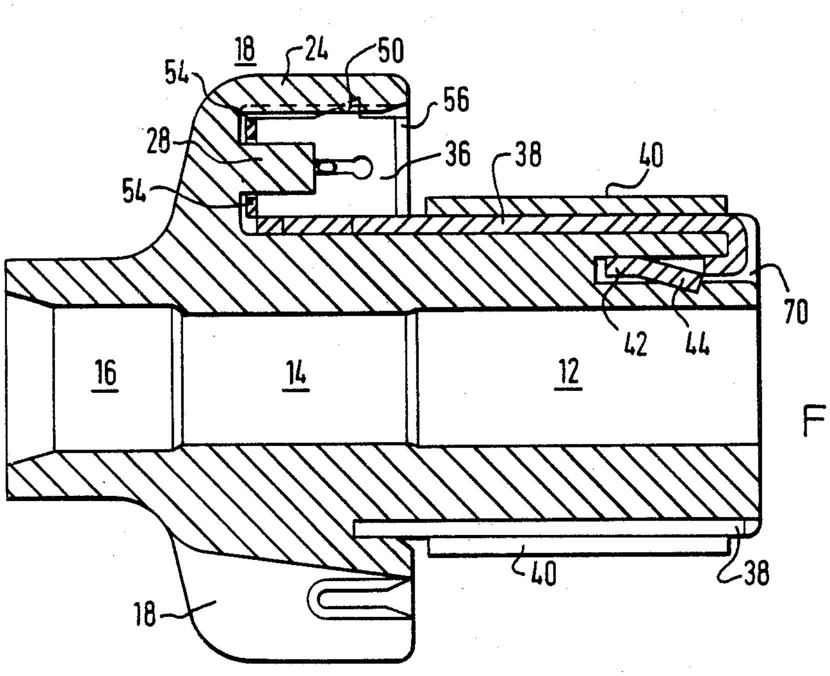
FIG. 5 is a vertical sectional view of the body of FIG. 1 showing the termination and terminal of FIGS. 2, 3 and 4, when attached to the body.
Figure 6:
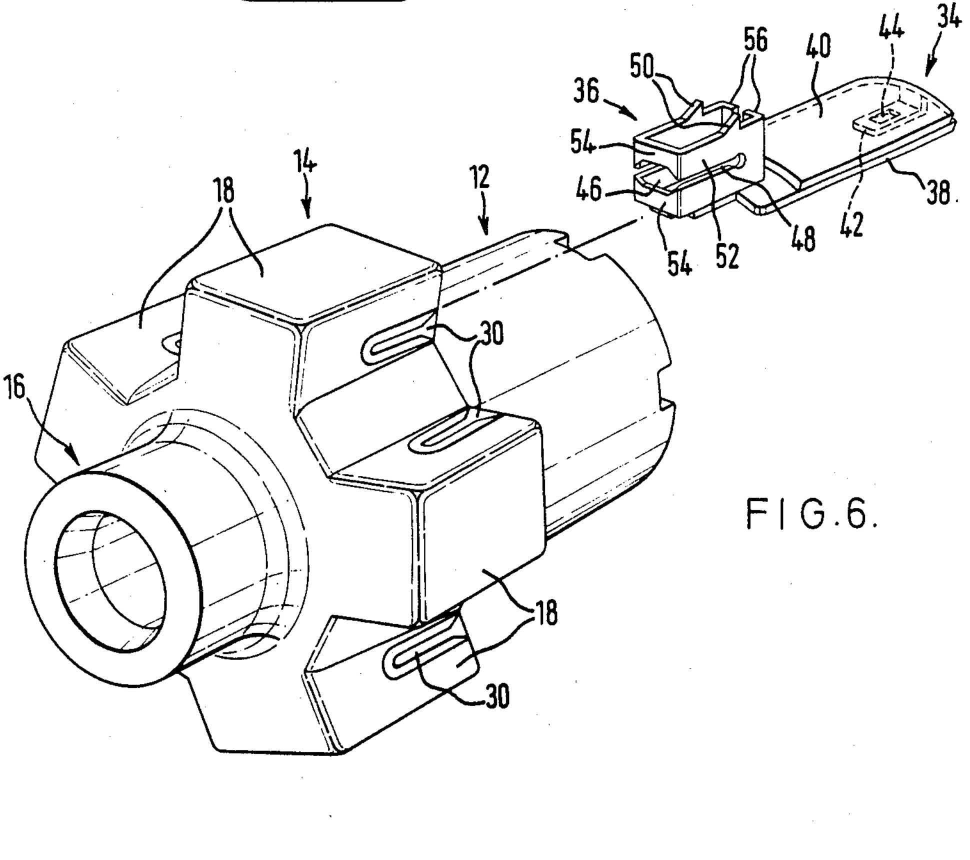
FIg. 6 is an exploded isometric view of the body 10 with respect to a combined commutator segment and terminal of FIGS. 2, 3 and 4 prior to insertion into the body.

FIG. 5 is a vertical section through the body 10. FIG. 5 shows shaped commutator segment 34 and the terminal 36 in position on the body 10. The terminal 36 enters the housing 18 and the central portion 54 of the terminal 36 passes over the boss 28. The winding portion 32 is guided into the key hole cut out 48. As the terminal 36 passes over the wire 32 the sharp edges 64 of the cutters 62 sever the insulation on the wire 32 and further entry of the terminal 36 forces the wire 32 into the narrow portion 68 of cut out 48.

The slight resilience provided by circular portion 66 and the relative sizes of the wire and the section 68 ensure that the arm 52 continue to bear against the wire 32 with a residual spring tension which maintains high contact pressure ensuring a reliable long term connection.

The barbs 50 grip the cover 24 of the housing 18 and therefore retain the terminal 36 within the housing 18. Additional retention may be provided by contact between the central portion 54 of the terminal 36 and the boss 28. The arms 52 of the terminal 36 can be bent at an angle slightly less than 90° from the central portion 54 so as to provide retention of the terminal 36 by action against the side wall 20 of the housing 18. Further retention is provided if the width of the terminal 36 is a close fit to the internal dimensions of the housing 18.

The front end of the body 10 is provided with five longitudinal recesses 70 which are cut away at the forward ends so as to meet the curved external surface of the commutator supporting section 12. Lug 42 of commutator segment 34 enters the recess 70 as the terminal 36 enters the housing 18. Tag 44 of lug 42 is forced into the material of the body 10 so as to rigidly restrain the lug 42 within recess 70. Commutator segment 34 is rigidly held in position on the supporting section 12 by interaction of lug 42 and tag 44 with recess 70 at its other end. The commutator segment 34 is regidly held on supporting section 12 and there is no fear of displacement even during high rotational accelarations.

Description will now be given of the assembly of an electric motor incorporating the present invention.

It will be seen that the assembly is greatly facilitated and is particularly suitable for inclusion in an automated process of manufacture. The body 10 is placed on the armature shaft with the spacer 16 against the base of the lamination stack. The lead wire of the armature winding is inserted into the housing 18 by laying the end of the wire 32 in the slots 30 provided in the side wall 20 of the housing 18. The wire 32 is drawn back into the housing 18 until it rests against the boss 28. From this start, the first armature coil is wound. At the end of the first coil winding the armature is indexed and the wire 32 is layed in the same manner in the next housing 18 without breaking the continuity of the wire 32.

The process is repeated until all coils have been wound and the tail end of the winding is then laid in the slots 30 of the first housing 18 and pushed back until it is adjacent to the lead end which was placed against the boss 28 at the beginning of the winding operation. The wire 32 is then cut and the armature removed from the winding machine.

THe body 10 now has a winding portion 32 comprising insulated wire laying in each of the housing 18. Each of the winding portions 32 is under tension and is pulled tight against the respective boss 28.

The combined commutator segment 34 and terminal 36 are prepared ready for insertion into the body 10. The commutator segment 34 and terminal 36 are provided in blank form as shown in FIG. 2. The commutator segment 34 consists of a bimetallic strip one layer of which constitutes the base 38 and the other layer of which constitutes the overlay 40. The material of the base 38 is brass of other metal having similar properties for providing the resilience required for the terminal 36 and lug 42. The overlay 40 is formed of copper which provides the properties necessary for its commutation function. In operation, the overlay 40 will be directly contacted by the brushes of the electric motor.

The commutator segments 34 are placed on the supporting section 12 of body 10 and are slid along the sections 12 so that the terminals 36 enter respective housings 18 and the lugs 42 enter the respective recesses 70.

As the terminal 36 approaches the winding portion 32 held in the housing 18, the slots provided by cut outs 48 move over the wire 32. The sharp edges 64 of the cutters 62 sever the insulation on the wire 32 which is deformed as the slots, formed by cut outs 48, move over the wire 32. Intimate metal to metal contact is thereby provided between the wire 32 and the terminal 36.

The arms 52 of the terminal 36 act as double cantilever springs and exert a continuous pressure on the wire 32.

The invention provides a simple and cheap connection between the armature winding and the commutator. No application of heat is required and the associated risk of distorting the body 10 is therefore avoided. No embrittlement of the winding wire is caused and problems associated with oxidation are also avoided. The use of flux is negated and there is no chemical reaction or consequent corrosion resulting from the connection. The armature winding is a single continuous winding and the danger of introducing slack by breaking the winding to effect a connection to each coil is completely avoided. Consequently, the danger of the armature winding being fretted when the motor is in operation, is significantly reduced. It should also be noted that the commutator segments 34 are introduced after the winding of the armature has been completed and therefore the danger of the wire being accidently stripped by abrasion on metal components during winding is very greatly reduced.

One specific embodiments has been described above with reference to the accompanying drawings. Several modifications have been mentioned above and it will be readily apparent to a person skilled in the art that many further modifications of the details of the above embodiment are possible without departing from the scope of the present invention.

Features not mentioned above are that the armature terminations could be in the form of slip rings and that the commutator segments 34 need not be bimetallic. Also the commutator segments could be bonded to the support section 12 and that the spacer 16 may include formations cooperating with the complementary formations on the winding stacks, so as to prevent angular displacement between the body 10 and the armature stacks. The wire of the armature winding may be formed of a material such as aluminum instead of copper and various sizes of wire can be accommodated depending upon permissible deformation of the wire by the slots of the terminal arms 52.

Although the use of slots in the arms of 52 of the terminal 36 have been described it is possible to use other configurations of the terminal for effecting connection to the winding portion 32. This is particularly so for fine grade winding wires in which case a series of serrations replace the slots in the terminal arms 52.

What is claimed:

1. An armature comprising a winding having connector portions coated with insulation, a body having a commutator segment support and a housing section, and three or more commutator segments seated on said segment support and respectively connected to connector portions of said winding, in which:

said housing section includes three or more housings which are respectively formed with housing recesses for said commutator segments and with means for positioning said connector portions of said winding relative to each housing recess;

each said commutator segment comprising an integral terminal disposed within one of said housing recesses;

said terminal of each said commutator segment being provided with two cutting eges for cutting insulation on said connector portion positioned relative to said housing recess receiving said terminal, and a slot which straddles and grips said connector portion positioned relative to said receiving housing recess; and said commutator segment support, said housing recesses, said connector portions, said terminals, said cutting edges and said slots are arranged so that said each commutator segment can be positioned on said body with a single translational movement, parallel to an axis of the slot in the commutator segment, in which said commutator segment is moved relative to said segment support and, at the same time, said cutting edges strip said insulation from the connector portion positioned relative to said housing and said slot establishes and maintains electrical contact by insulation displacement.

2. An armature in accordance with claim 1 wherein said terminal is provided with a barb for retaining said terminal and said connector portion in said housing recess.

3. An armature in accordance with claim 1 wherein each of said commutator segments comprises a tag which cooperates with a part of said armature which defines a tag recess so as to locate and retain said segment on said armature, in addition to said retention of said segment provided by said terminal.

4. An armature in accordance with claim 3 wherein said segment support is in the form of a cylinder and each tag recess provided in an end face of said cylinder.

5. An armature in accordance with claim 1 wherein said body is of unitary construction and is molded from an insulating plastic material.

6. An armature in accordance with claim 1 wherein each of said terminals is comprised of bimetallic strip.

7. An armature in accordance with claim 1 wherein said body is provided with first guide means and each of said commutator segments is provided with second guide means cooperable with said first guide means and aligned parallel to said axis of said slot in said terminal of said respective commutator segment.

* * * * *